United States Patent
Gelabert et al.

(10) Patent No.: US 10,524,196 B2
(45) Date of Patent: Dec. 31, 2019

(54) INTRA CONTROL NODE HANDOVER AGNOSTIC TO USER NODES

(71) Applicant: Huawei Technologies Co., Ltd., Shenzhen (CN)

(72) Inventors: Xavier Gelabert, Kista (SE); Yinggang Du, Shenzhen (CN); George Koudouridis, Kista (SE); Andrey Krendzel, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 44 days.

(21) Appl. No.: 15/782,597

(22) Filed: Oct. 12, 2017

(65) Prior Publication Data
US 2018/0041950 A1    Feb. 8, 2018

Related U.S. Application Data

(63) Continuation of application No. PCT/EP2015/062609, filed on Jun. 5, 2015.

(51) Int. Cl.
| | |
|---|---|
| *H04W 4/00* | (2018.01) |
| *H04W 48/16* | (2009.01) |
| *H04W 36/30* | (2009.01) |
| *H04W 24/10* | (2009.01) |
| *H04W 48/20* | (2009.01) |
| *H04W 72/12* | (2009.01) |

(Continued)

(52) U.S. Cl.
CPC .......... *H04W 48/16* (2013.01); *H04W 24/10* (2013.01); *H04W 36/30* (2013.01); *H04W 48/20* (2013.01); *H04W 72/1231* (2013.01); *H04L 5/006* (2013.01); *H04W 72/085* (2013.01)

(58) Field of Classification Search
CPC . H04W 48/16; H04W 72/1231; H04W 48/20; H04W 24/10; H04W 36/30; H04W 72/085; H04L 5/006
USPC .......................................................... 455/434
See application file for complete search history.

(56) References Cited

U.S. PATENT DOCUMENTS

| | | | |
|---|---|---|---|
| 6,961,571 B1 | 11/2005 | Rune et al. | |
| 2007/0253355 A1* | 11/2007 | Hande | H04W 16/06 370/328 |

(Continued)

FOREIGN PATENT DOCUMENTS

| | | |
|---|---|---|
| CN | 1310528 C | 4/2007 |
| EP | 1107636 A1 | 6/2001 |

(Continued)

*Primary Examiner* — Amancio Gonzalez
(74) *Attorney, Agent, or Firm* — Leydig, Voit & Mayer, Ltd.

(57) ABSTRACT

A first Control Node (CNd) and a method therein, for selecting a serving CNd for a User Node (UNd) by communication with at least a second CNd. The first CNd is configured to receive an uplink beacon measurement report comprising at least one measurement of an UNd uplink beacon, from at least one Access Node (ANd) controlled by the first CNd. The first CNd is further configured to preliminarily select a serving CNd for the UNd, based on the received uplink beacon measurement report concerning the UNd; confirm the preliminarily selected serving CNd by communication with the second CNd; and, select serving CNd for the UNd when the preliminarily selected serving CNd is confirmed by the second CNd.

16 Claims, 10 Drawing Sheets

(51) Int. Cl.
*H04L 5/00* (2006.01)
*H04W 72/08* (2009.01)

(56) References Cited

U.S. PATENT DOCUMENTS

| | | | | |
|---|---|---|---|---|
| 2016/0007236 A1* | 1/2016 | Roeland | ............ | H04W 36/0011 |
| | | | | 370/331 |
| 2016/0345222 A1* | 11/2016 | Axmon | ............. | H04W 36/0016 |
| 2017/0223148 A1* | 8/2017 | Roeland | .................. | H04L 12/66 |
| 2017/0265133 A1* | 9/2017 | Chandramouli | .. | H04W 52/0241 |

FOREIGN PATENT DOCUMENTS

| | | | |
|---|---|---|---|
| GB | 2493183 | A | 1/2013 |
| WO | 0176282 | A2 | 10/2001 |

\* cited by examiner

INTRA CONTROL NODE HANDOVER AGNOSTIC TO USER NODES

CROSS-REFERENCE TO RELATED APPLICATIONS

This application is a continuation of International Application No. PCT/EP2015/062609, filed on Jun. 5, 2015, the disclosure of which is hereby incorporated by reference in its entirety.

TECHNICAL FIELD

Implementations described herein generally relate to a first Control Node (CNd), a method in a first CNd, a second CNd, a method in a second CNd, and a User Node (UNd). In particular is herein described a mechanism for selecting a serving CNd for a UNd by the first CNd in communication with the second CNd.

BACKGROUND

Consider a communication network where a number of Access Nodes (ANds) are deployed in a given area. Mobile User Nodes (UNds) access the network wirelessly. In order to efficiently coordinate the network and the mobility of UNds in a densely deployed topology of ANds, e.g. situated in the range of 30-50 m apart, Coordinator Nodes (CNds) are introduced at the level of the access network domain as a control plane entity. Each CNd is responsible for a subset of ANds. The role of the CNd is to control and coordinate the communication (e.g. schedule resources, assign power levels, etc.) between UNds and the ANds within its area.

In 3rd Generation Partnership Project (3GPP) Long Term Evolution (LTE) a similar role of the CNd is handled by the Mobility Management Entity (MME), but only at a core network level. The MME handles all LTE-related control plane signalling, including mobility and security functions. In particular, the MME is responsible for idle mode UE (User Equipment) mobility including support for Tracking Area management, paging, and tagging procedure related to retransmissions. The MME is also involved in the bearer activation/deactivation procedures and is also responsible for choosing the Serving Gateway (S-GW) and the Packet Data Network Gateway (P-GW) for a UE at the initial attach and at the time of intra-LTE handover involving a Core Network (CN) node relocation.

In LTE, the role of the aforesaid CNd is borne by the Mobility Management Entity (MME). The MME change and (re-)selection process in LTE is required for different mobility and location management procedures (e.g. S1-based handover). When moving, the UE detects and measures reference signals from surrounding access nodes (eNBs in LTE nomenclature), either regularly or when instructed by the network. The UE reports the measurements back to the network side. If the Reference Symbol Received Power (RSRP) from a neighbouring eNB is larger than the serving eNB, the network (through the source eNB) initiates a mobility management procedure that can involve the MME relocation with the necessary signalling information exchange between all related network entities.

In Wideband Code Division Multiple Access (WCDMA), the corresponding equivalent of the aforesaid CNd would be the Radio Network Controller (RNC). The procedure for Inter-RNC handover (either soft or hard) also involves the measurement by the UE of pilot Ec/I0 values from different NodeBs. NodeB is the WCDMA terminology for ANd. Then, if certain threshold-based events occur, measurements are reported back to the serving NodeB and from there to the serving RNC (SRNC) which takes decisions on the handover process (e.g. add, remove or replace links in the active set of the UE). A relocation of SRNC will happen when, for example, if all radio links in the active set belong to the Drift RNC (DRNC). Thus, at some point the SNRC decides to transfer the UE context to the DRNC which will now become the new SRNC. The new SRNC will then establish a connection of the Iu interface towards the Core Network.

With the conventionally known solutions in LTE, it is always the UE that initiates mobility management procedures (e.g. related to the handover process) by reporting measurements back to the network which will then send signalling messages via the MME and may include change of MME. There will be also a response signalling back and forth between the source and target eNBs to acknowledge whether such handover is accepted or not. This procedure will be time-consuming especially when targeting for shorter latency requirements for 5G networks. In addition, link failure points in the LTE handover process arise from the fact that the UE is heavily involved in signalling between the network and itself. This is especially true when dealing with handovers in a dense small cell scenario. In this case, by the time the UE measures the corresponding neighbour's RSRP and detects a predefined offset between serving and target cells (known as A3 offset) during some specified time interval known as Time-To-Trigger (TTT), the UE may already be in a state where the link to the serving eNB is too poor to convey the measurement report. Thus a handover failure occurs. In LTE macro cell scenarios this could be partially solved by optimization of aforesaid parameters TTT and A3 offset (among others). For a dense small cell scenario this has proven to be insufficient. A solution to simplify the procedure, by making the mobile terminal agnostic to the handover process and not requiring performing network measurements, is required. This will in turn shorten the overall latency and prohibit handover failures between eNBs and MMEs.

In the case of WCDMA, measurements are also performed at the UE and are sent back to the NodeB and from there to the serving RNC. The UE synchronises to all cells that are within detection range, identifies each cell and decodes the System Frame Number (SFN). According to whether the detected cell is an already identified cell or a new cell in the neighbour list, the WCDMA standard specifies that the UE needs to report the measurements within between 200 ms and 800 ms respectively. In the considered case of dense small cell networks these measurement reporting times are insufficient. In addition, the change of serving RNC will also be triggered by such measurement reports which, with the specified timeframes, may not be enough to the reacting times required by ultra-dense networks.

Thus, in order to enable implementation of ultra-dense networks, new solutions are required for making intra control node handover of UNds.

SUMMARY

It is therefore an object to obviate at least some of the above mentioned disadvantages and to improve selection and reselection of CNd for a specific mobile UNd in a wireless communication network.

This and other objects are achieved by the features of the appended independent claims. Further implementation forms are apparent from the dependent claims, the description and the figures.

According to a first aspect, a first Control Node (CNd) is provided for selecting a serving CNd for a User Node (UNd) by communication with at least a second CNd. The first CNd is configured to receive an uplink beacon measurement report comprising at least one measurement of an UNd uplink beacon, from at least one Access Node (ANd), controlled by the first CNd. Further the first CNd is configured to preliminary select serving CNd for the UNd, based on the received uplink beacon measurement report concerning the UNd. Additionally the first CNd is configured to confirm the preliminary selection by communication with the second CNd. The first CNd is configured to select serving CNd for the UNd when the preliminary selected serving CNd is confirmed by the second CNd.

By transmitting uplink beacon signals from the UNd and measuring received signal strength/quality of the received signal at ANds on the network side, the decision to make the CNd selection can be made on the network side by any or both of the CNds, without any additional communication between the UNd and the network. Thereby time is saved, which enable a shorter time used for the CNd selection thanks to the reduced latency. Thereby CNd selection can be made also in a network with a dense topology of ANds and CNds. Further, energy is saved at the UNd, which may prolong the battery activity time between re-charge. Furthermore, the possibility of a UNd keeping its sequence code will improve the user experience by not having to undergo a sequence code selection at the target CNd, thus causing some additional signalling and delay.

In a first possible implementation of the first CNd according to the first aspect, the first CNd is further configured to select serving CNd for the UNd based on a received uplink beacon signal power exceeding a threshold value allowing for decoding of the uplink beacon, as received by the ANd, comprised in the received beacon measurement report; or a ratio between the number of ANds controlled by the first CNd and the number of ANds controlled by the second CNd, which have received the uplink beacon of the UNd with an uplink beacon signal power exceeding the threshold value allowing for decoding of the beacon; exceeding a threshold ratio.

Thereby, alternative solutions are provided for reselecting the serving CNd, i.e. by measuring the received beacon signal power, or by calculating a ratio between ANds controlled by the first CNd and the second CNd, respectively.

In a second possible implementation of the first CNd according to the first aspect, or according to the first possible implementation of the first CNd according to the first aspect, the first CNd is further configured to confirm the preliminary selection by sending a selection request to the second CNd. Further the first CNd is configured to receive a selection acceptance from the second CNd, whereafter the CNd requested as serving CNd in the selection request is selected as serving CNd for the UNd.

Thereby, further implementation details are defined and specified.

In a third possible implementation of the first CNd according to the first aspect, or according to any of the previously described possible implementations, the first CNd is further configured to transfer a signature sequence used by the UNd to the second CNd.

Thereby, it may be avoided to have the UNd change signature sequence in case there is no conflict with other signature sequences allocated by the second CNd, in a scenario wherein the second CNd is becoming serving CNd of the UNd.

In a fourth possible implementation of the first CNd according to the first aspect, or according to any of the previously described possible implementations, the first CNd is further configured to receive information on the signature sequence of the uplink beacon signal of the UNd from the second CNd. Also, the first CNd is configured to determine if the received signature sequence could be used by the UNd when the first CNd is selected as serving CNd for the UNd without conflicting with other signature sequences allocated by the first CNd.

Thereby, further implementation details are defined and specified.

In a fifth possible implementation of the first CNd according to the first aspect, or according to any of the previously described possible implementations, the first CNd is further configured to confirm the preliminary selection by transmitting a measurement report to the second CNd; receiving a selection request from the second CNd; and sending a selection acceptance to the second CNd.

Thereby, further implementation details are defined and specified.

According to a second aspect, a method is provided in a first CNd, for selecting serving CNd for a UNd by communication with at least a second CNd. The method comprises receiving an uplink beacon measurement report comprising at least one measurement of an UNd uplink beacon, from at least one ANd controlled by the first CNd. The method further comprises preliminary selecting serving CNd for the UNd, based on the received uplink beacon measurement report concerning the UNd. Furthermore the method also comprises confirming the preliminary selection by communication with the second CNd. The method in addition comprises selecting serving CNd for the UNd when the preliminary selected serving CNd is confirmed by the second CNd.

According to a first possible implementation of the method according to the second aspect, wherein the selection of serving CNd for the UNd based on a received uplink beacon signal power exceeding a threshold value allowing for decoding of the uplink beacon, as received by the ANd, comprised in the received beacon measurement report; or a ratio between the number of ANds controlled by the first CNd and the number of ANds controlled by the second CNd, which have received the uplink beacon of the UNd with an uplink beacon signal power exceeding the threshold value allowing for decoding of the beacon; exceeding a threshold ratio.

According to a second possible implementation of the method according to the second aspect, or the first possible implementation of the second aspect, the confirmation of the preliminary selection by sending a selection request to the second CNd; and receiving a selection acceptance from the second CNd; whereafter the CNd requested as serving CNd in the selection request is selected as serving CNd for the UNd.

According to a third possible implementation of the method according to the second aspect, or according to any of the previously described possible implementations thereof, the method further comprises transferring a signature sequence used by the UNd to the second CNd.

According to a fourth possible implementation of the method according to the second aspect, or according to any of the previously described possible implementations thereof, the communication with at least a second CNd comprises receiving information on the signature sequence of the uplink beacon signal of the UNd from the second CNd. Further the method also comprises determining if the received signature sequence could be used by the UNd when the first CNd is selected as serving CNd for the UNd without conflicting with other signature sequences allocated by the first CNd.

According to a fifth possible implementation of the method according to the second aspect, or according to any of the previously described possible implementations thereof, the method step of confirming the preliminary selection may comprise transmitting a measurement report to the second CNd; receiving a selection request from the second CNd; and sending a selection acceptance to the second CNd.

According to a third aspect, a second CNd is provided for communicating with a first CNd. The second CNd is configured to receive an uplink beacon measurement report concerning a UNd from at least one ANd controlled by the second CNd; and communicate information related to serving CNd selection of the UNd, with the first CNd.

In a first possible implementation of the second CNd according to the third aspect, the second CNd is further configured to determine a number of ANds controlled by the second CNd, which have received an uplink beacon of the UNd, with an uplink beacon signal power exceeding a threshold value allowing for decoding of the beacon. Further, the communicated information comprises the determined number of ANds.

In a second possible implementation of the second CNd according to the third aspect, or according to the first possible implementation of the second CNd according to the first aspect, the communication comprises receiving a selection request from the first CNd; and sending a selection acceptance to the first CNd; whereafter the CNd requested as serving CNd in the selection request is selected as serving CNd for the UNd.

In a third possible implementation of the second CNd according to the third aspect, or according to any of the previously described possible implementations, the second CNd is further configured to receive information on the signature sequence of the uplink beacon signal of the UNd from the first CNd. Further the second CNd is configured to check if the received signature sequence could be used by the UNd when the second CNd is selected as serving CNd for the UNd without conflicting with other signature sequences allocated by the second CNd.

In a fourth possible implementation of the second CNd according to the third aspect, or according to any of the previously described possible implementations, the second CNd is further configured to send information on the signature sequence of the uplink beacon signal of the UNd, to the first CNd.

In a fifth possible implementation of the second CNd according to the third aspect, or according to any of the previously described possible implementations, the second CNd is further configured to communicate information related to serving CNd selection of the UNd by receiving a measurement report concerning the UNd, from the first CNd. The second CNd is further configured to suggest a serving CNd to be selected for the UNd, based on the measurement report concerning the UNd received from the first CNd and the uplink beacon measurement report concerning the UNd received from the ANd, controlled by the second CNd. Further the second CNd is configured to send a selection request to the first CNd; and receiving a selection acceptance from the first CNd.

According to a fourth aspect, a method in a second CNd is provided for communicating with a first CNd. The method comprises receiving an uplink beacon measurement report concerning a UNd from at least one ANd controlled by the second CNd. Further the method comprises communicating information related to serving CNd selection of the UNd, with the first CNd.

In a first possible implementation of the method in the second CNd according to the fourth aspect, the method comprises determining a number of ANds controlled by the second CNd, which have received an uplink beacon of the UNd, with an uplink beacon signal power exceeding a threshold value allowing for decoding of the beacon. Further, the communicated information comprises the determined number of ANds.

In a second possible implementation of the method in the second CNd according to the fourth aspect, or according to the first possible implementation thereof, the method further comprises receiving a selection request from the first CNd and sending a selection acceptance to the first CNd; whereafter the CNd requested as serving CNd in the selection request is selected as serving CNd for the UNd.

In a third possible implementation of the method in the second CNd according to the fourth aspect, or according to any of the previously described possible implementations, the method further comprises receiving information on the signature sequence of the uplink beacon signal of the UNd from the first CNd. Further the method comprises checking if the received signature sequence could be used by the UNd when the second CNd is selected as serving CNd for the UNd without conflicting with other signature sequences allocated by the second CNd.

In a fourth possible implementation of the method in the second CNd according to the fourth aspect, or according to any of the previously described possible implementations, the method further comprises sending information on the signature sequence of the uplink beacon signal of the UNd, to the first CNd.

In a fifth possible implementation of the method in the second CNd according to the fourth aspect, or according to any of the previously described possible implementations, the method further comprises communicating information related to serving CNd selection of the UNd by receiving a measurement report concerning the UNd, from the first CNd. The method in addition comprises suggesting a serving CNd to be selected for the UNd, based on the measurement report concerning the UNd received from the first CNd and the uplink beacon measurement report concerning the UNd received from the ANd, controlled by the second CNd. Further the method comprises sending a selection request to the first CNd, and receiving a selection acceptance from the first CNd.

According to a fifth aspect, a UNd is provided for transmitting an uplink beacon to be received by an ANd, controlled by a CNd. The UNd is configured to receive a signature sequence from the CNd being a serving CNd; and transmit the uplink beacon to be received by the ANd.

According to a sixth aspect, a method in a UNd is provided for transmitting an uplink beacon to be received by an ANd, controlled by a CNd. The method comprises receiving a signature sequence from the CNd being a serving CNd; and transmitting the uplink beacon to be received by the ANd.

According to a seventh aspect, a communication interface is provided between a first CNd according to the first aspect, for communication with a second CNd according to the third aspect when selecting serving CNd for a UNd according to the fifth aspect.

According to an eighth aspect, a computer program comprising program code is provided, for performing a method according to the second aspect, the fourth aspect or the sixth aspect, or any possible implementations thereof, when the computer program runs on a computer.

The advantages of the method according to the second aspect, the second CNd according to the third aspect, the method according to the fourth aspect, the UNd according to the fifth aspect, the method according to the sixth aspect, the communication interface according to the seventh aspect and the computer program according to the eighth aspect are the same as those for the corresponding device claims according to the first aspect.

Other objects, advantages and novel features of the aspects of the disclosure will become apparent from the following detailed description.

BRIEF DESCRIPTION OF THE DRAWINGS

Various embodiments are described in more detail with reference to attached drawings, illustrating examples of embodiments of the disclosure in which.

DETAILED DESCRIPTION

Embodiments of the disclosure described herein are defined as a first CNd, a method therein, a second CNd, a method therein, a UNd, a communication interface and a computer program, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
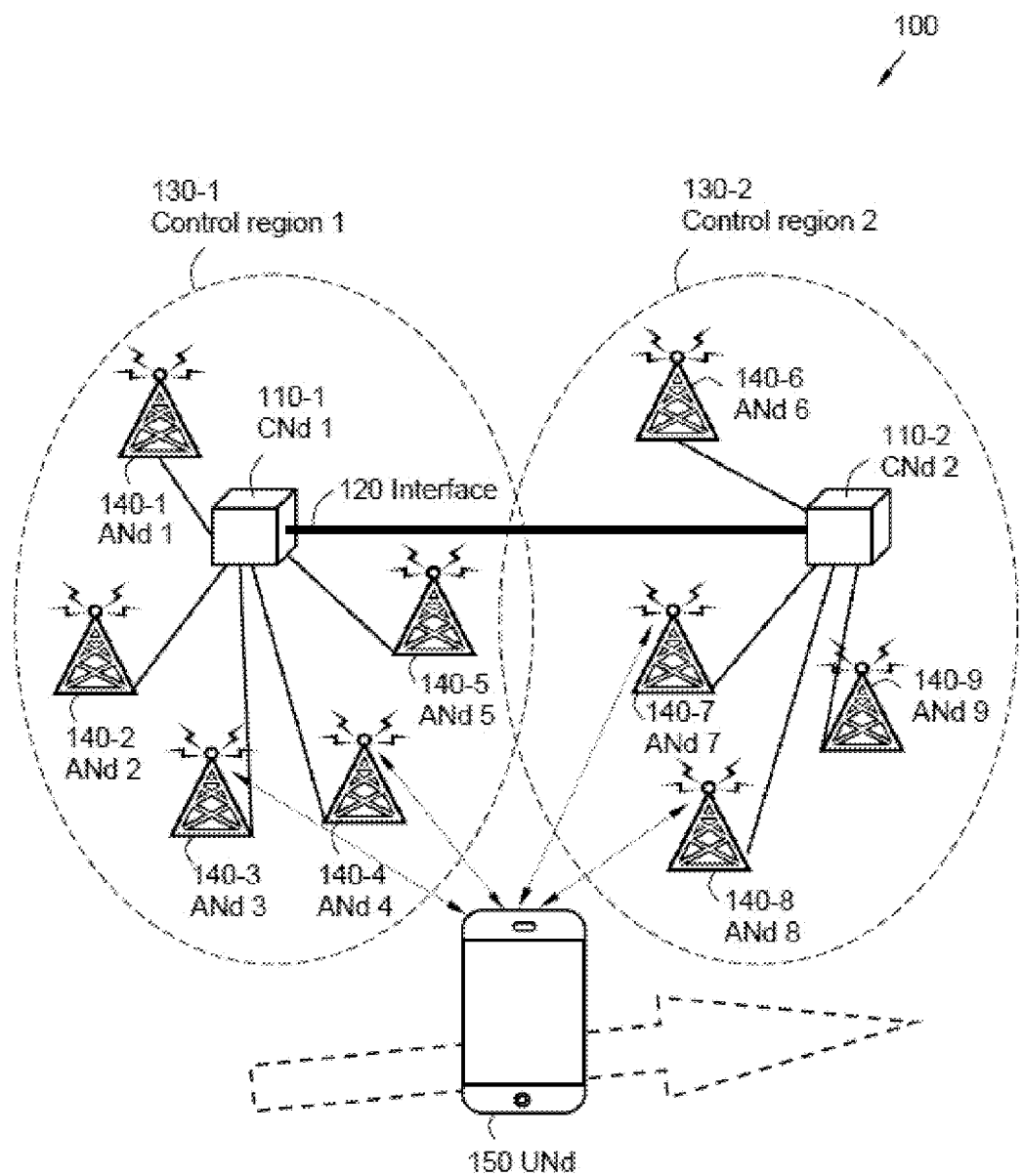
FIG. 1 is a block diagram illustrating a wireless communication network according to some embodiments.

FIG. 1 is a schematic illustration over a wireless communication network 100 comprising a first control node (CNd) 110-1 and a second CNd 110-2. The CNds 110-1, 110-2 are connected via an interface 120, over which information may be sent from one CNd 110-1, 110-2 to another. The first CNd 110-1 controls a plurality of access nodes (ANds) 140-1, 140-2, 140-3, 140-4, 140-5 in a first control region 130-1, while the second CNd 110-1 controls a plurality of access nodes (ANds) 140-6, 140-7, 140-8, 140-9 in a second control region 130-2. Further a mobile user node (UNd) 150 is illustrated in FIG. 1.

The ANds 140-1, 140-2, 140-3, 140-4, 140-5, 140-6, 140-7, 140-8, 140-9 may according to some embodiments be configured for wireless downlink transmission and may be referred to, respectively, as e.g., a base station, NodeB, evolved Node Bs (eNB, or eNode B), base transceiver station, Access Point Base Station, base station router, Radio Base Station (RBS), macro base station, micro base station, pico base station, femto base station, Home eNodeB, sensor, beacon device, relay node, repeater or any other network node configured for communication with the UNd 150, over a wireless interface, depending, e.g., of the radio access technology and/or terminology used.

The UNd 150 may correspondingly be represented by, e.g. a wireless communication terminal, a mobile cellular phone, a Personal Digital Assistant (PDA), a wireless platform, a mobile station, a tablet computer, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with one or more ANds 140-1, 140-2, 140-3, 140-4, 140-5, 140-6, 140-7, 140-8, 140-9, according to different embodiments and different vocabulary.

It is to be noted that the illustrated network setting of two CNds 110-1, 110-2; nine ANds 140-1, 140-2, 140-3, 140-4, 140-5, 140-6, 140-7, 140-8, 140-9 and one UNd 150 in FIG. 1 is to be regarded as a non-limiting example of an embodiment only. The wireless communication network 100 may comprise any other number and/or combination of CNds 110-1, 110-2; ANds 140-1, 140-2, 140-3, 140-4, 140-5, 140-6, 140-7, 140-8, 140-9 and UNds 150. A plurality of UNds 150 and another configuration of CNds 110-1, 110-2 and/or ANds 140-1, 140-2, 140-3, 140-4, 140-5, 140-6, 140-7, 140-8, 140-9 may thus be involved in some embodiments of the disclosure.

Thus whenever "one" or "a/an" UNd 150, ANds 140-1, 140-2, 140-3, 140-4, 140-5, 140-6, 140-7, 140-8, 140-9 and/or CNds 110-1, 110-2 is referred to in the present context, a plurality of UNd 150, ANds 140-1, 140-2, 140-3, 140-4, 140-5, 140-6, 140-7, 140-8, 140-9 and/or CNds 110-1, 110-2 may be involved, according to some embodiments.

The first CNd 110-1 is responsible for controlling a set of ANds 140-1, 140-2, 140-3, 140-4, 140-5, which in turn defines the first control region 130-1. Correspondingly, the second CNd 110-2 is responsible for controlling a set of ANds 140-6, 140-7, 140-8, 140-9, defining the second control region 130-2.

Specifically, each control region 130-1, 130-2 comprises a combination of coverage areas of ANds 140-1, 140-2, 140-3, 140-4, 140-5, 140-6, 140-7, 140-8, 140-9 connected to the same CNd 110-1, 110-2.

The CNd 110-1, 110-2 selects, among its controlled ANds 140-1, 140-2, 140-3, 140-4, 140-5, 140-6, 140-7, 140-8, 140-9, which ANd 140-1, 140-2, 140-3, 140-4, 140-5, 140-6, 140-7, 140-8, 140-9 will provide downlink control connectivity to each UNd 150. A reselection of the serving CNd 110-1 is necessary whenever the UNd 150 moves out from the control region 130-1 of a particular CNd 110-1 into the control region 130-2 of another CNd 110-2. It may be noted that one ANd 140-1, 140-2, 140-3, 140-4, 140-5, 140-6, 140-7, 140-8, 140-9 can be connected to two CNds 110-1, 110-2 simultaneously, in this case both CNds 110-1, 110-2 would receive information from this ANd 140-1, 140-2, 140-3, 140-4, 140-5, 140-6, 140-7, 140-8, 140-9 and would need to coordinate.

It may be assumed that different CNds 110-1, 110-2 can communicate and share information over some predefined network interface 120.

It may further be assumed that the UNd 150 transmits uplink (UL) reference signals (henceforth UL beacons) at either regular intervals (periodically) and/or at particular time instants (aperiodically). Reference signals are designed using sets of signature sequences exhibiting low auto and cross-correlation properties (e.g. Zadoff-Chu sequences). Further, each control region 130-1, 130-2 assigns UNds 150 with signature sequences corresponding to different sequence groups, so that UL beacons are easily separable at reception. In addition, neighbouring CNds 110-1, 110-2 are allowed to coordinate and share the information on the signature sequence set allocated to its UNds 150. This allows the detection of UL beacons not only in the serving control region but also in neighbour control regions (by e.g. appropriately cross-correlating against the neighbouring sequence group). For example, in FIG. 1, the UNd 150 transmits an UL beacon according to signature sequence indicated by the first CNd 110-1. However, there are two ANds 140-7, 140-8 belonging to the second control region 130-2 that can overhear the beacon.

Each UNd 150 is wirelessly connected to the network through at least one ANd 140-1, 140-2, . . . , 140-9. For the control plane, the UNd 150 receives DL control signalling from at least a single ANd 140-1, 140-2, . . . , 140-9 at any given time over a DL Control Channel (DCCH). Similarly UL control signalling over an UL Control Channel (UCCH) can be received by multiple ANds 140-1, 140-2, . . . , 140-9. For the data plane, UL and DL data flows can be transmitted/received to/from multiple ANds 140-1, 140-2, . . . , 140-9 over a Data Channel (DCH). For the purpose of UNd 150 tracking and positioning, the UNd 150 transmits UL reference signals (i.e. UL beacons) over a defined Beacon Channel (BeCH). The UNd 150 can decode beacon configuration information from the DCCH. UNd-specific information on the DCCH is assumed to be preceded by a DL reference signal identifying the transmitting ANd 140-1, 140-2, . . . , 140-9. It may be assumed that the UNd 150 is able to decode DL control information from multiple ANds 140-1, 140-2, . . . , 140-9 but, for energy saving reasons, it may choose to do so for a limited number of ANds 140-1, 140-2, . . . , 140-9, based on the received power measured on the DL signals.

According to some embodiments, a procedure is described to deal with the (re-) selection between different CNd coverage areas for a UNd 150. The expressions serving CNd selection and serving CNd reselection may be used intermittently herein. The selection can be triggered by either the target CNd 110-2 or source CNd 110-1. Such selection can be transparent to the UNd 150. The CNd selection may be based on the exchange of used signature sequence codes by the UNds 150 between neighbouring CNds 110-1, 110-2. The detection of the UNd UL beacon's transmission may be made by the target CNd 110-2 by decoding its sequence code at target ANd(s) 120-6, 120-7, 120-8, 120-9. The selection decision and subsequent preparation and execution may be made when some measured coverage indication ratio indicates so based on the received power of ANds 140-1, 140-2, . . . , 140-9 receiving the UL beacon and/or the number of ANds 140-1, 140-2, . . . , 140-9 receiving the UL beacon; or a combination of both. Further, the potential assignment of a new signature sequence code for the UNd 150 during selection execution may be made.

Figure 2:
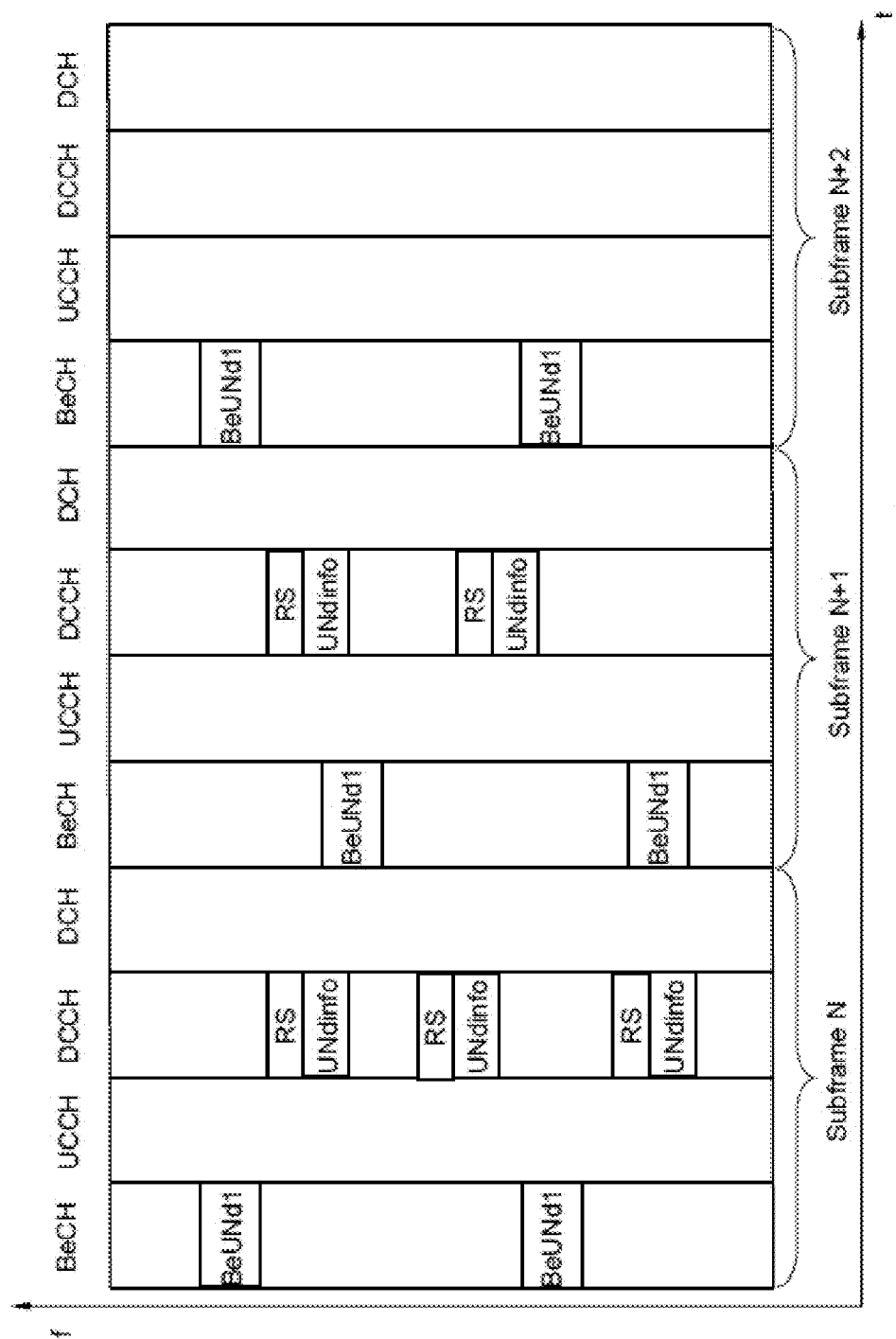
FIG. 2 is a block diagram illustrating a frame structure according to some embodiments.

FIG. 2 describes a considered frame structure with the abovementioned channels.

The UL beacon is transmitted in the BeCH, by the UNd 150. The UNd 150 receives DL control signalling from the ANd 140-1, 140-2, . . . , 140-9 in the DCCH. The UNd 150 decodes the received Reference Signal (RS) from the N strongest received ANd 140-1, 140-2, . . . , 140-9. UNd specific information follows; e.g. beacon pattern in the next subframe.

Figure 3:
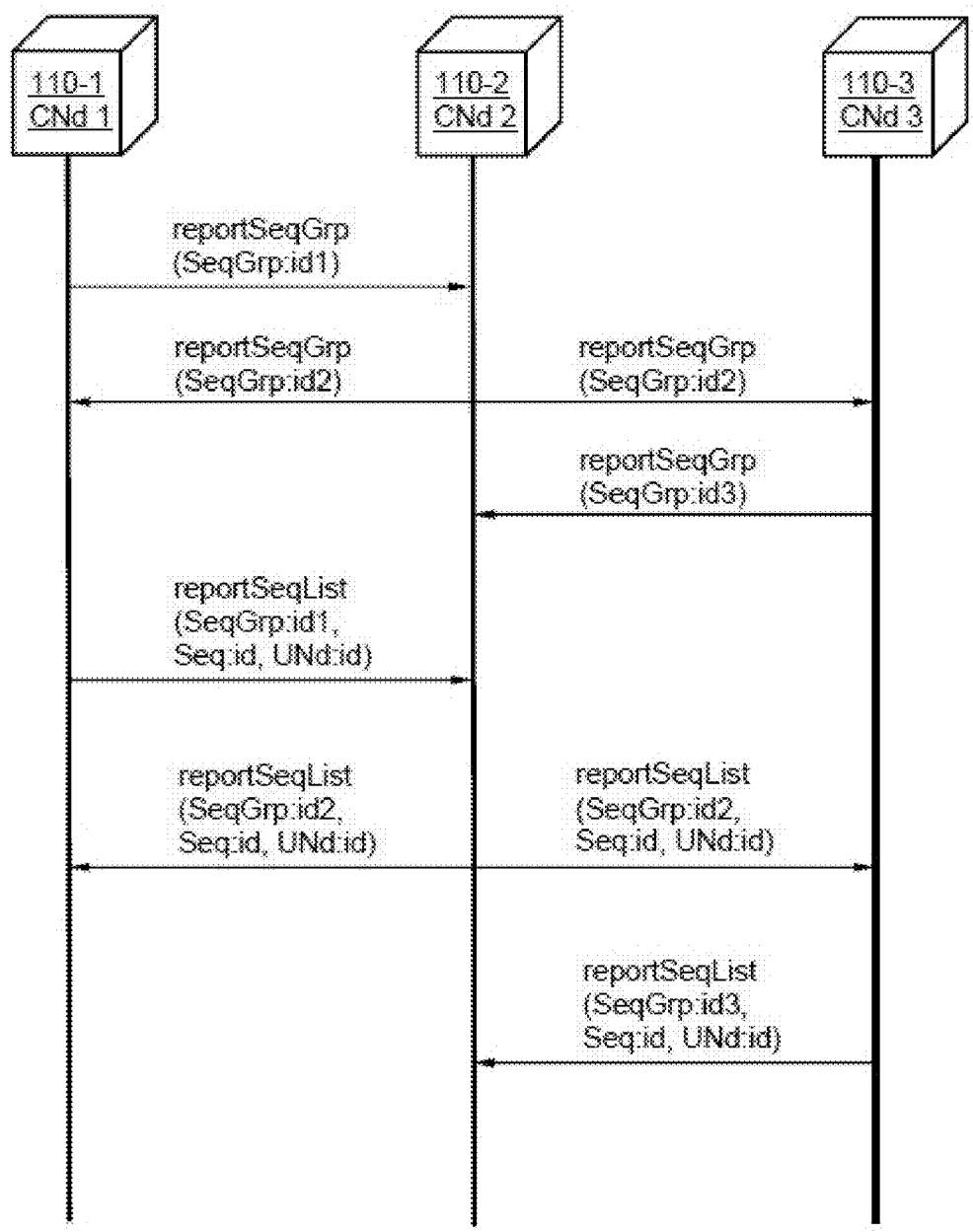
FIG. 3 is a combined block diagram and signalling chart illustrating message exchange between nodes in a wireless communication network according to some embodiments.

FIG. 3 illustrates message exchange between CNds 110-1, 110-2, 110-3 to share used sequence groups (message reportSeqGrp) or to share the list of UNds 150 and allocated sequences (message reportSeqList).

For the exchange of used sequence codes between CNds 110-1, 110-2, 110-3 messages sent over the interface 120 can indicate which sequence group is using each CNd 110-1, 110-2, 110-3 see messages reportSeqGrp in FIG. 3. Alternatively, a list containing the sequence group, the user ID and the allocated sequence within the group could be transmitted, see messages reportSeqList in FIG. 3. The trigger for transmitting such reports may be based on timers or requested on-demand. Each CNd 110-1, 110-2, 110-3 is then responsible to transmit the sequence code information to its ANds 140-1, 140-2, . . . , 140-9 where the beacon decoding takes place. In particular, the neighbour sequence code information will be sent preferably to those ANds 140-1, 140-2, . . . , 140-9 that are close to the neighbour control region.

Figure 4:
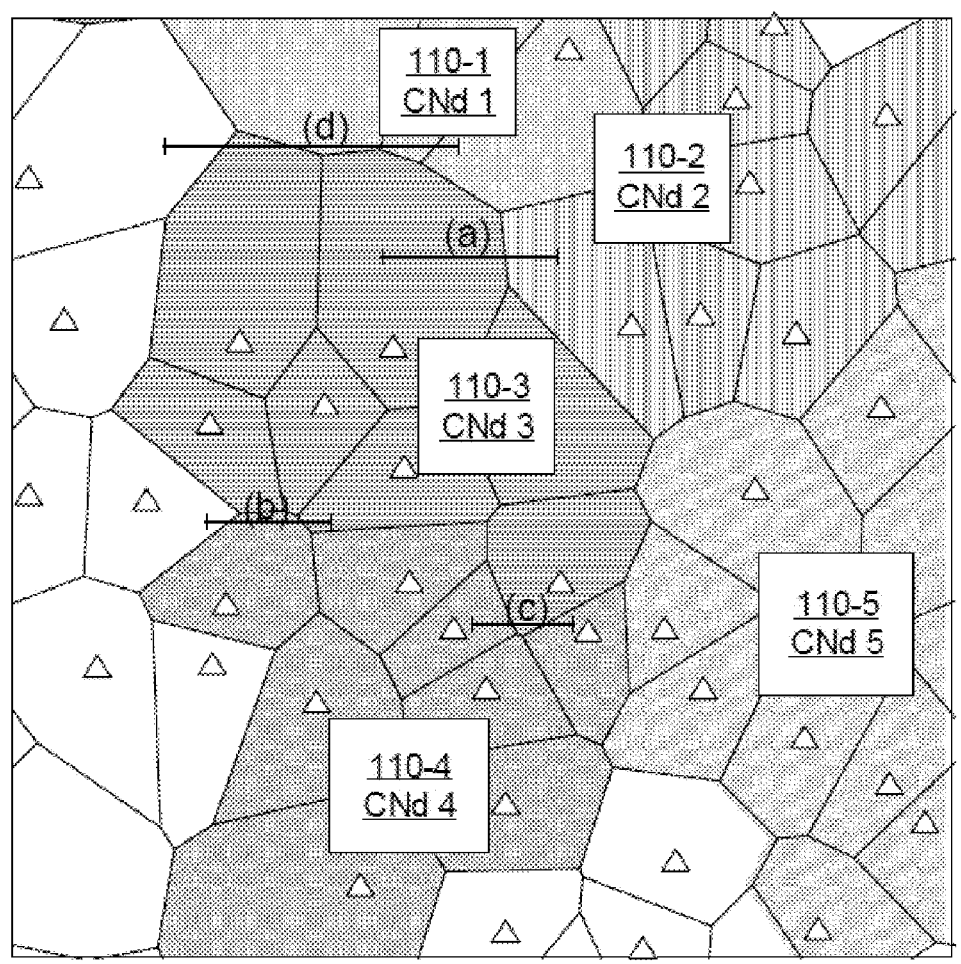
FIG. 4 is a block diagram illustrating network nodes and controlling network nodes in a wireless communication network according to some embodiments.

FIG. 4 illustrates a deployment example considering five CNds 110-1, 110-2, 110-3, 110-4, 110-5 and randomly deployed ANds 140-1, 140-2, . . . , 140-9 (represented as triangles). Solid lines represent distance-based coverage regions for each ANd 140-1, 140-2, . . . , 140-9. Control regions of different CNd 110-1, 110-2, 110-3, 110-4, 110-5 are shaded in different patterns. Segments labelled (a), (b), (c) and (d) indicate example UNd trajectories, without loss of generality, from left to right. Wraparound conditions may be assumed.

The CNd selection happens when a UNd 150 belonging to a particular control region 130-1, 130-2 (source control region) moves into another control region 130-1, 130-2 (target control region) managed by another CNd (target CNd). For example, in FIG. 4 a UNd 150 following the trajectory indicated by segment (a) will require at some stage a CNd reselection from CNd 3 110-3 to CNd 2 110-2. The CNd selection procedure basically may involve, in some embodiments, to make a CNd selection decision, i.e. a process determining if a CNd selection is necessary based on a number of inputs. Decision may be taken either at the source CNd or at the target CNd.

Further, the CNd selection procedure comprises a CNd selection preparation: if positive selection decision has been made, a sequence of messages between the source and target CNds are exchanged so that both ends agree on the serving CNd selection.

Additionally the CNd selection procedure comprises the CNd selection execution: it may involve the necessary message exchanges for the target CNd to gain control over the UNd 150 and the release of the source CNd.

Figure 5:
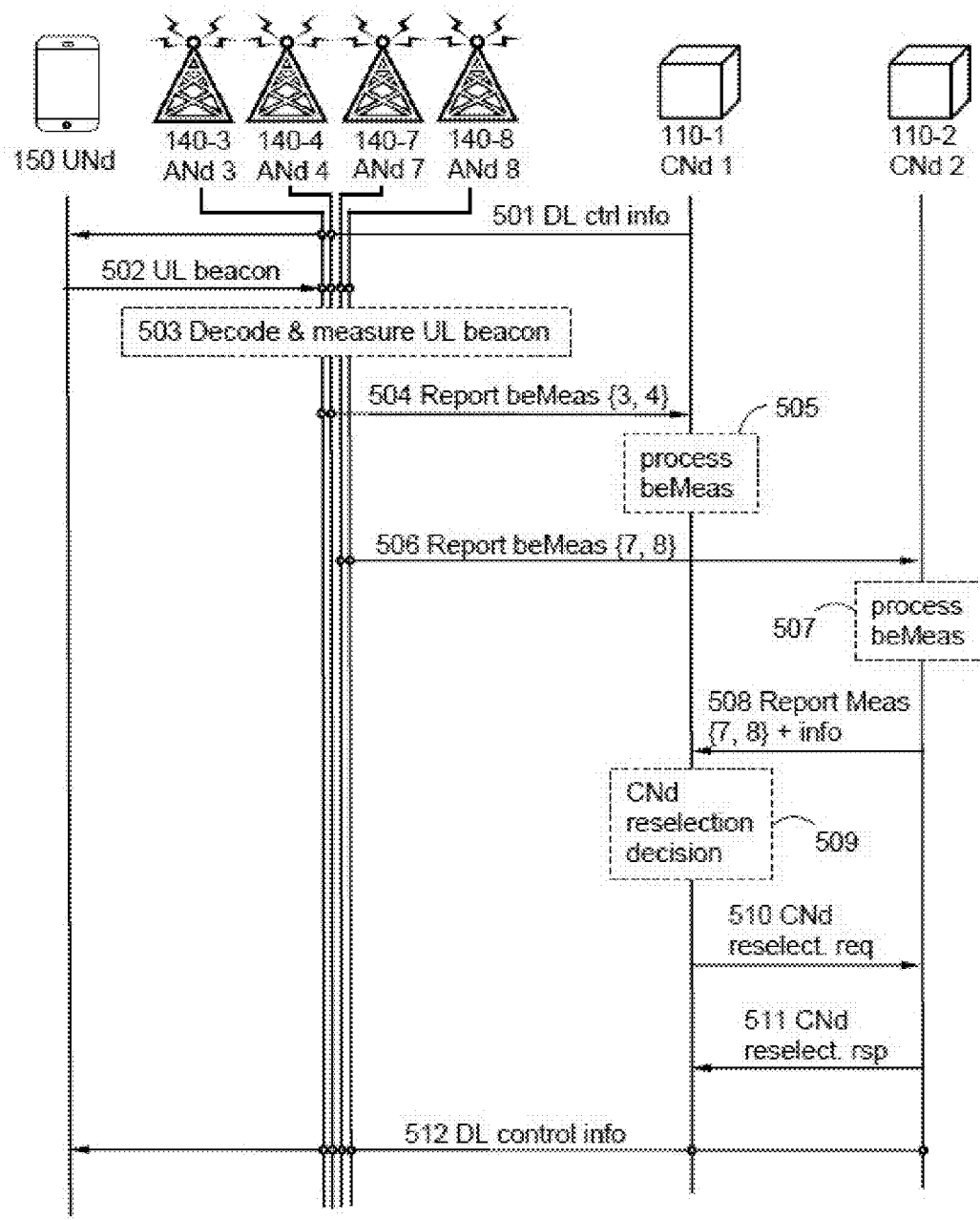
FIG. 5 is a block diagram illustrating a source-triggered control node selection according to some embodiments.

FIG. 5 illustrates a source-triggered CNd selection according to an embodiment.

The first CNd 110-1 is the source CNd, i.e. the currently serving CNd and the second CNd 110-2 is the target CNd, i.e. the future serving CNd, in this example. These expressions may be used alternately.

In a first step 501, the first CNd 110-1 transmits downlink control information via the ANd 3 140-3 and the ANd 4 140-4, which are controlled by the first CNd 110-1, to the UNd 150.

The UNd 150 is transmitting uplink beacon signals in step 502 at a certain time interval, to be received by ANds 140-3, 140-4, 140-7, 140-8 within reach.

In step 503, the respective ANds 140-3, 140-4, 140-7, 140-8 having received the UL beacons decode and measure the received uplink beacon.

In step 504, the ANds 140-3, 140-4 controlled by the first CNd 110-1 are reporting their measurements to the first CNd 110-1, which in turn process the received beacon measurements in step 505.

In step 506, the ANds 140-7, 140-8 controlled by the second CNd 110-2 are reporting their measurements to the second CNd 110-2, which in turn process the received beacon measurements in step 507.

Thus the target CNd 110-2 receives UL beacon measurements from one or more ANds 140-7, 140-8 under its control sent by a UNd 150 controlled by another CNd 110-1, i.e. the source CNd. The target CNd 110-2 can obtain the beacon information and measurements since, for example, it has received some information on the used signature sequence from the source CNd 110-1 through interface 120. In this case, the target CNd 110-2 sends a measurement report to the source CNd 110-1 over the interface 120 in step 508. The measurement report may include UNd ID, signal strength measurements, the IDs of the different ANds 140-1, 140-2, . . . , 140-9 receiving the UL beacon, etc. This measurement report could also contain information on the sequence code to be used if the selection is decided, or if the same sequence could still be used in the target control area. Furthermore, the measurement report may be triggered based on a threshold value of the received signal strength, or the number of ANds 140-1, 140-2, . . . , 140-9 receiving the beacon or any combination of such metrics. The threshold value can be exchanged or agreed between the source and the target CNds 110-1, 110-2. The decision to select the CNd 110-1, 110-2 may be done at the serving CNd 110-1 based on the received and historical information in some embodiments in step 509. If deemed necessary, a selection request is sent from the source to the target CNd 110-2 in step 510. The selection request can include an indication on whether the used sequence code should be maintained (if possible). In step 511, the source CNd 110-1 receives a response from the target CNd 110-2, DL control information can be sent from either the source CNd 110-1, or the target CNd 110-2 to the UNd 150, with the necessary information in step 512. The response from the target CNd 110-2 may comprise an indication on whether the UNd 150 can still use the same sequence code as in the source CNd 110-1, or not.

In another embodiment, the source CNd 110-1 based on UL beacon measurements from a UNd 150 within its control region identifies that the UNd 150 is moving out towards the control region of another CNd 110-2, i.e. the target CNd. It will then send a selection request to the target CNd 110-2 which can decide whether to acknowledge (ACK) or not acknowledge (NACK) the serving CNd selection. If it accepts the selection it replies back to the source CNd 110-1 with the necessary information. Then, the target CNd 110-2 then may start sending new DL control information for this UNd 150.

Figure 6:
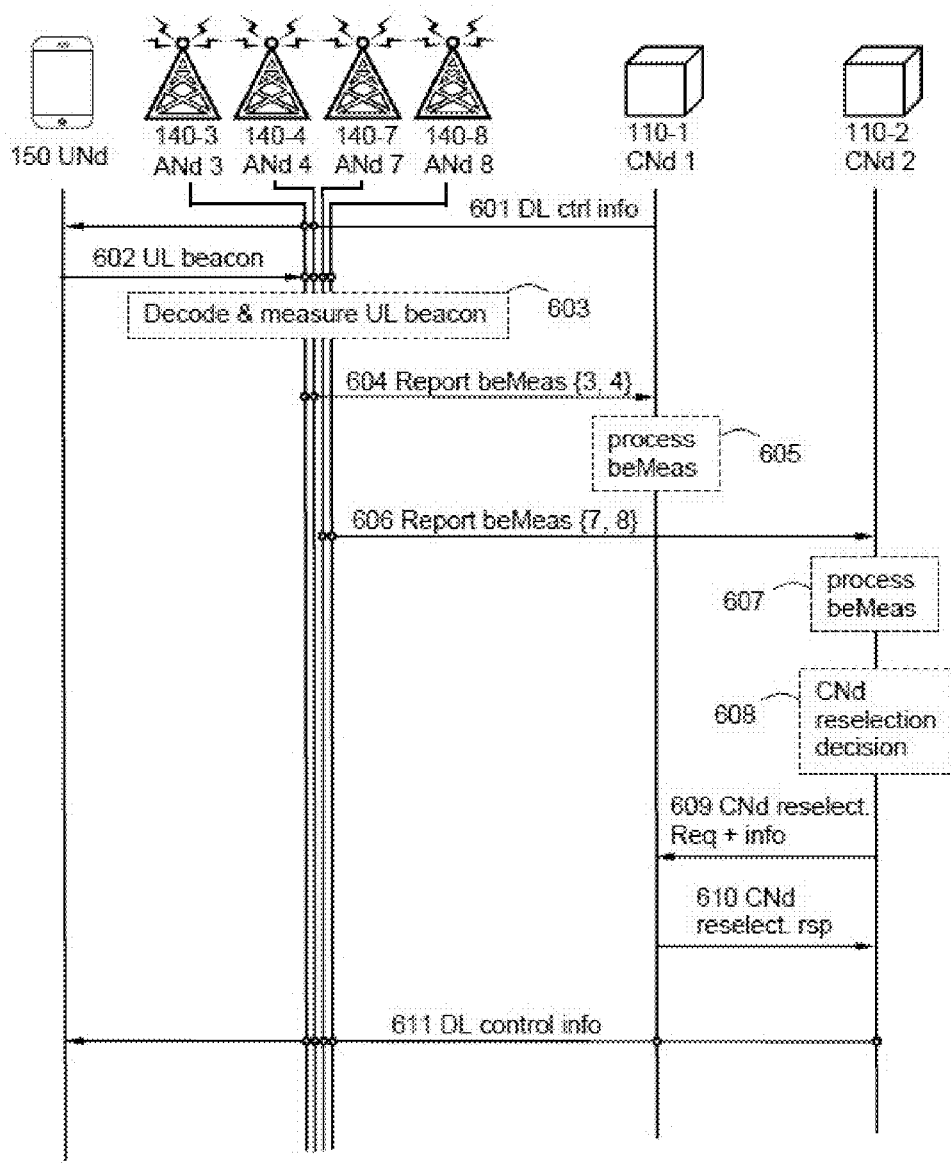
FIG. 6 is a block diagram illustrating a target-triggered control node selection according to some embodiments.

FIG. 6 illustrates target-triggered CNd selection according to an embodiment.

In this scenario, the first CNd 110-1 is the source CNd, i.e. the currently serving CNd and the second CNd 110-2 is the target CNd, i.e. the future serving CNd, in this example. These expressions may be used alternately.

In a first step 601, the first CNd 110-1 transmits downlink control information via the ANd 3 140-3 and the ANd 4 140-4, which are controlled by the first CNd 110-1, to the UNd 150.

The UNd 150 is transmitting uplink beacon signals in step 602 at a certain time interval, to be received by ANds 140-3, 140-4, 140-7, 140-8 within reach.

In step 603, the respective ANds 140-3, 140-4, 140-7, 140-8 having received the UL beacons decode and measure the received uplink beacon.

In step 604, the ANds 140-3, 140-4 controlled by the first CNd 110-1 are reporting their measurements to the first CNd 110-1, which in turn process the received beacon measurements in step 605.

In step 606, the ANds 140-7, 140-8 controlled by the second CNd 110-2 are reporting their measurements to the second CNd 110-2, which in turn process the received beacon measurements in step 607.

The target CNd 110-2 receives UL beacon measurements from one or more ANds 140-1, 140-2, . . . , 140-9 under its control sent by a UNd 150 controlled by another CNd 110-1, the source CNd. In this case, the target CNd 110-2 based on the received measurements and historical information, such information can be obtained from CNds 110-1, 110-2 via the communication interface 120, and may decide whether a CNd selection is necessary in step 608. If so, it sends a selection request (or reselection request) to the source CNd 110-1 with some information motivating the selection along with the necessary selection information in step 609. The source CNd 110-1 may accept (ACK) or reject (NACK) the selection through a CNd selection response in step 610. Upon acceptance, the source or target CNd 110-2 notifies the UNd 150 with the necessary information for the selection through the DL control channel, including new beacon sequences if any, new resource element location to send beacons, etc., in step 611. Such handover information may also be transferred to the core network side for flow routing, billing, etc.

In another embodiment, the selection of CNd may be performed by means of transferring a signature sequence used by a UNd 150 from a source CNd 110-1 to a target CNd 110-2. In this case the target CNd 110-2 should make sure that such signature sequence will not conflict with signature sequences allocated to this CNd 110-2, nor with signature sequences allocated to neighbour CNds 110-1.

In addition, the triggering of the CNd selection decision process may be defined on a per UNd basis or on a per traffic basis. In one embodiment the triggering of the CNd selection of a UNd 150 may be based on the UL beacon coverage area of the UNd 150 as compared to the source control region 130-1 and the target control region 130-2. If the UL beacon area covers a certain number of ANds 140-1, 140-2 . . . , 140-9 at the target control region 130-2 and/or the ratio between the ANds 140-1, 140-2, . . . , 140-9 reached in the target control region 130-2 over the source control region 130-1. The ratio between the ANds 140-1, 140-2, . . . , 140-9 reached in the target control region 130-2 over the source control region 130-1 that would trigger the CNd selection may be agreed among the source and the target CNds 110-1, 110-2. This ratio comprises a coverage area indication the computation of which requires exchanging information about the numbers of ANds 140-1, 140-2, . . . , 140-9 reached in the source and the target control region 130-1, 130-2. For example, the coverage area indication can be derived based on the number of the ANds 140-1, 140-2, . . . , 140-9 reached in target control area over the source control area and/or the (aggregate/average) received signal strength at the reached ANds 140-1, 140-2, . . . , 140-9 in target control area over the source control area; and or a combination thereof.

Figure 7:
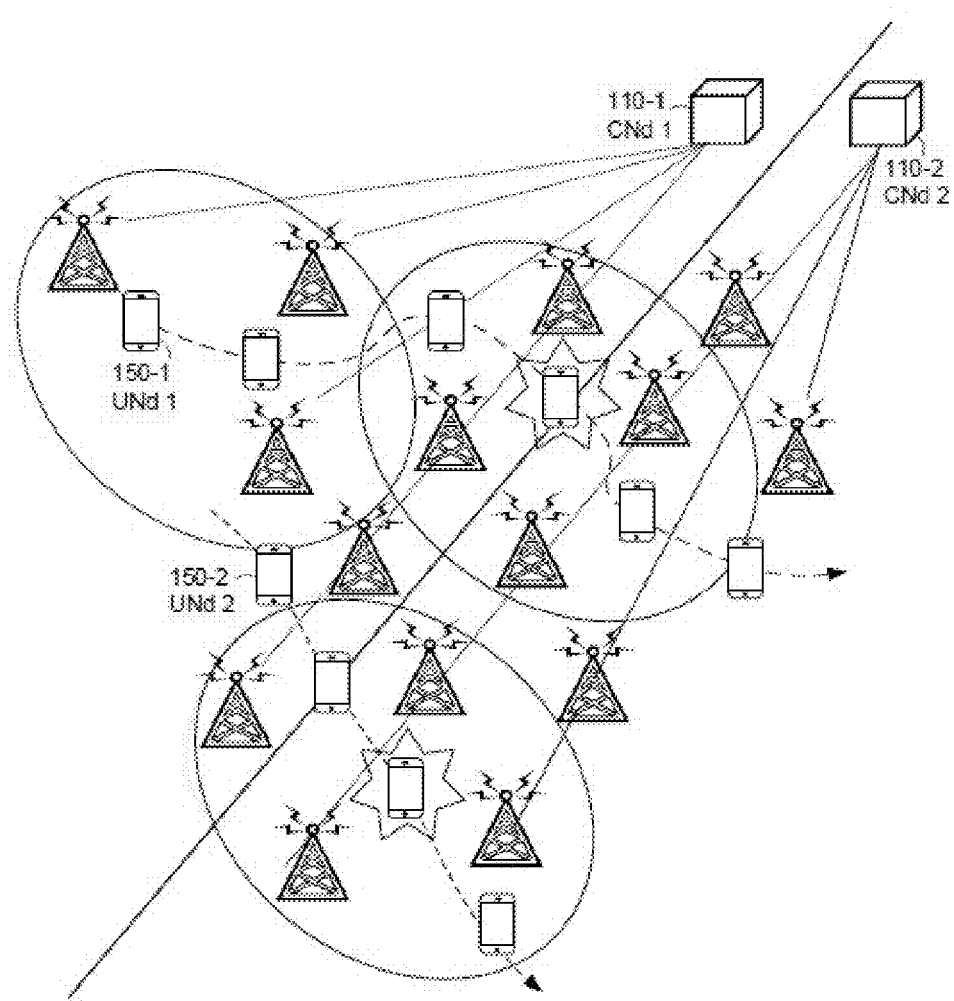
FIG. 7 is a block diagram illustrating an uplink beacon coverage area and a coverage area ratio according to some embodiments.

FIG. 7 illustrates the UL beacon coverage area and the coverage area ratio of two UNds 150 in movement between two areas controlled by two different CNds 110-1, 110-2.

Furthermore in one embodiment, the UL beacon coverage area may be defined by the signal strength of the UL beacon is upon a threshold value at which UL beacon decoding is feasible. In another embodiment, this threshold may be set and agreed between the source and the target CNd 110-1, 110-2 as a function of the ANd density and the traffic in the area.

It has to be noted that the coverage area ratio depends on the parameter used to define UL beacon coverage area. UL beacon coverage area definition may comprise the parameter used to define the reception of a UL beacon; and the threshold value of the UL beacon reception indicating when reception is sufficient and/or acceptable. For example, UL beacon coverage area may be defined by the received signal strength of the UL beacon, or the estimated achievable rates. To this end, the coverage area ratios of different parameters are expected to be different.

The CNd 110-1, 110-2 best serving a UNd 150 can be selected with little involvement by the UNd 150 when a user moves between control regions 130-1, 130-2. With the described scheme, the user experience can be maintained. The decision on CNd selection is transparent to the UNd 150 owing to the transmission of uplink beacons that brings some benefits in terms of latency in overall selection process and energy savings at the UNd 150. Furthermore, the possibility of a UNd 150 keeping its sequence code will improve the user experience by not having to undergo a sequence code reselection at the target CNd, thus causing some signalling and delay.

In some embodiments, the procedure for CNd selection may be based on the exchange of sequence code information between neighbouring CNds 110-1, 110-2, by means of the introduced interface 120, the detection of UNds ID thereof, and the measurement of uplink beacon received power.

Further, the described solution may comprise reporting of CNd selection measurements from a target CNd 110-2 to a source CNd 110-1 and the decision process at the latter to select the new source CNd based on own and reported measurements thereof.

In addition, the provided solution comprises CNd selection decision process taken at the source CNd 110-1 based on own measurements.

Further, the disclosed solution comprises the reporting of CNd selection measurements from a source CNd 110-1 to a target CNd 110-2 and the decision process at the latter to select the new source CNd based on own and reported measurements thereof.

The disclosed solution according to some embodiments also comprises the CNd selection decision process taken at the target CNd 110-2, based on own measurements.

In some embodiments, the CNd selection decision process may be taken at the target CNd 110-2 based on own measurements.

In some further embodiments, the CNd selection decision may be based on the ratio between the number of ANds 140-1, 140-2, . . . , 140-9 successfully decoding the beacon in the target CNd 110-2 and source CNd 110-1, and the exchange of necessary information thereof.

According to some embodiments, the CNd selection may be based on the beacon received power by the ANds 140-1, 140-2, . . . , 140-9 successfully decoding the beacon in the target CNd 110-2 and source CNd 110-1.

In some embodiments, the determination on whether the UNd 150 can use the same sequence code after a CNd selection has happened, and the exchange of necessary information in order to avoid sequence conflicts between the target CNd 110-2 and the source CNd 110-1.

Thereby, efficient procedures are provided for selecting and reselecting the CNd 110-1, 110-2 for a specific mobile UNd 150 in an ultra-dense network environment. In some embodiments the current mobility management schemes releasing the UNd 150 to perform network measurements is enhanced. This in turn translates into better latency in the overall serving CNd selection process. An additional benefit can be achieved in terms of energy savings at the UNd 150 since aforementioned (conventional) DL signal measurements are no longer necessary.

Figure 8:
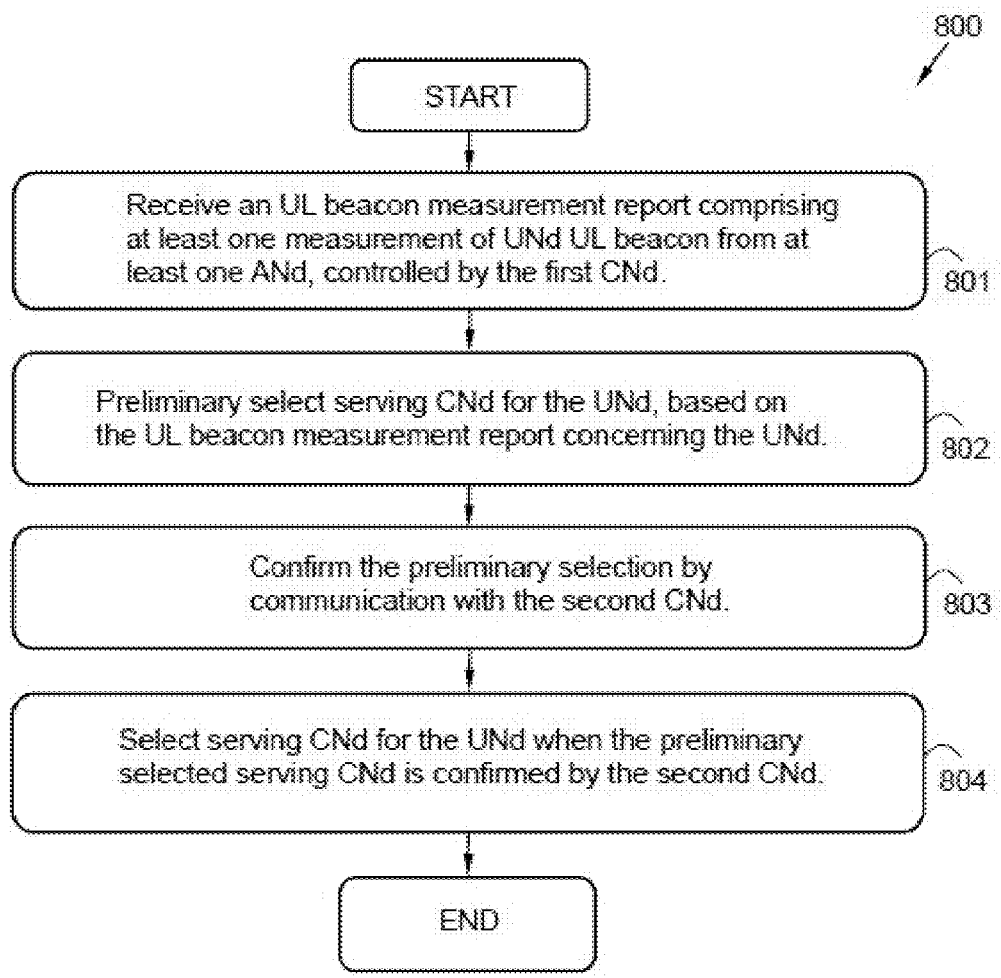
FIG. 8 is a flow chart illustrating a method according to an embodiment of the disclosure.

FIG. 8 is a flow chart illustrating embodiments of a method 800 for use in a first Control Node (CNd) 110-1, for selecting serving CNd for a User Node (UNd) 150 in cooperation with at least one second CNd 110-2, i.e. by communication with said second CNd 110-2. The UNd 150 transmits an uplink beacon signal, to be received by at least one Access Node (ANd) 140-1, 140-2, . . . , 140-9 in a CNd control region 130-1, 130-2 of the first CNd 110-1. The ANd 140-1, 140-2, . . . , 140-9 detects the UNd 150 uplink beacon signal by decoding its sequence code.

To appropriately reselect serving CNd for the UNd 150, the method 800 may comprise a number of method steps 801-804.

It is however to be noted that any, some or all of the described steps 801-804, may be performed in a somewhat different chronological order than the enumeration indicates, be performed simultaneously or even be performed in a reversed order according to different embodiments. Further, it is to be noted that some steps may be performed in a plurality of alternative manners according to different embodiments, and that some such alternative manners may be performed only within some, but not necessarily all embodiments.

The first CNd 110-1 may in some embodiments periodically re-perform any, some or all of actions 801-804, thereby enabling a reselection of serving CNd for the UNd 150, due to mobility of the UNd 150 according to some embodiments. The method 800 may comprise the following method steps:

Step 801 comprises receiving an uplink beacon measurement report comprising at least one measurement of an uplink beacon signal emitted by the UNd 150, from at least one ANd 140-1, 140-2, . . . , 140-9, controlled by the first CNd 110-1.

Step 802 comprises preliminary selecting serving CNd for the UNd 150, based on the received 801 uplink beacon measurement report concerning the UNd 150.

The serving CNd for the UNd 150 may be preliminary selected based on a received uplink beacon signal power exceeding a threshold value allowing for decoding of the uplink beacon, as received by the ANd 140-1, 140-2, . . . , 140-9, comprised in the received beacon measurement report; or a ratio between the number of ANds 140-1, 140-2, . . . , 140-9 controlled by the first CNd 130-1 and the number of ANds 140-1, 140-2, . . . , 140-9 controlled by the second CNd 130-2, which have received the uplink beacon of the UNd 150 with an uplink beacon signal power exceeding the threshold value allowing for decoding of the beacon; exceeding a threshold ratio.

Step 803 comprises confirming the preliminary selection 802 by communication with the second CNd 110-2.

The communication with the second CNd 110-2 may comprise e.g. receiving a measurement report concerning the UNd 150, made by an ANd 140-1, 140-2, . . . , 140-9 controlled by the second CNd 110-2, in some embodiments.

However, in some embodiments the communication with the second CNd 110-2 may comprise e.g. transmitting a measurement report concerning the UNd 150, made by an ANd 140-1, 140-2, . . . , 140-9 controlled by the first CNd 110-1, in some embodiments.

In some embodiments, the first CNd 110-1 is further configured to confirm the preliminary selection by sending a selection request to the second CNd 110-2 and receiving a selection acceptance from the second CNd 110-2, whereafter the CNd 110-1, 110-2 requested as serving CNd in the selection request is selected as serving CNd for the UNd 150.

In some embodiments, the sent selection request may not arrive at the second CNd 110-2, or alternatively, the transmitted selection acceptance of the second CNd 110-2 may not be received by the first CNd 110-1. For preventing such communication errors, a timer may be introduced and set by the first CNd 110-1 when transmitting the selection request, and if a response is not received from the second CNd 110-2 within a predetermined time limit, the selection request may be retransmitted. In some embodiments, a lack of response to the selection request within the predetermined time limit may be regarded as a selection rejection.

In some cases, the second CNd 110-2 cannot accept the serving CNd for the UNd 150 as suggested by the first CNd 110-1 in the selection request and thus return a selection rejection to the first CNd 110-1. In this case, the CNd requested as serving CNd in the sent selection request is not selected as serving CNd for the UNd 150.

The communication between the first CNd 110-1 and the second CNd 110-2 may comprise receiving information on the signature sequence of the uplink beacon signal of the Und 150 from the second CNd 110-2. Further, the communication may comprise determining if the received signature sequence could be used by the UNd 150 when the first CNd 110-1 is selected as serving CNd for the UNd 150 without conflicting with other signature sequences allocated by the first CNd 110-1.

The confirmation of the preliminary selection 802 may in some embodiments comprise transmitting a measurement report to the second CNd 110-2, receiving a selection request from the second CNd 110-2 and sending a selection acceptance to the second CNd 110-2.

In some embodiments, wherein the first CNd 110-1 is selected as serving CNd for the UNd 150, the step of confirming the preliminary selection 802 by communication with the second CNd 110-2 may comprise: sending a selection request to the second CNd 110-2, and receiving a selection acceptance from the second CNd 110-2.

In some embodiments, wherein the first CNd 110-1 is selected as serving CNd for the UNd 150, the step of confirming the selection decision by communication with the second CNd 110-2 comprises: receiving a selection request from the second CNd 110-2 and sending a selection acceptance to the second CNd 110-2.

The step of confirming the selection decision by communication with the second CNd 110-2 may in some embodiments comprise: transmitting a measurement report to the second CNd 110-2; receiving a selection request from the second CNd 110-2; and sending a selection acceptance to the second CNd 110-2, in some embodiments.

Step 804 comprises selecting serving CNd for the UNd 150 when the preliminary selected 802 serving CNd is confirmed 803 by the second CNd 110-2.

In some embodiments, wherein the second CNd 110-2 is selected as serving CNd for the UNd 150, a signature sequence used by the UNd 150 may be transferred to the second CNd 110-2, for enabling the second CNd 110-2 to make sure that the signature sequence will not conflict with other signature sequences allocated by the second CNd 110-2.

In some embodiments, wherein the first CNd 110-1 is a target CNd and the second CNd 110-2 is a source CNd, the step of sending control information associated with the selection of serving CNd, to the UNd 150 may comprise receiving information on the signature sequence of the uplink beacon signal of the UNd 150 from the source CNd (i.e. the second CNd 110-2) through the communication interface 120.

In some embodiments, the method 800 further may comprise making sure that the signature sequence will not conflict with other signature sequences allocated by the first CNd 110-1.

In some embodiments, the communication between the first CNd 110-1 and the second CNd 110-2 may comprise transferring a signature sequence used by the UNd 150 to the second CNd 110-2.

Furthermore, in some embodiments, control information associated with the selection of serving CNd may be sent to the UNd 150. Such control information may comprise e.g. information for the selection through the DL control channel, including new beacon sequences if any, new resource element location to send beacons, etc. Such handover information may also be transferred to the core network side for flow routing, billing, etc., in some embodiments.

Figure 9:
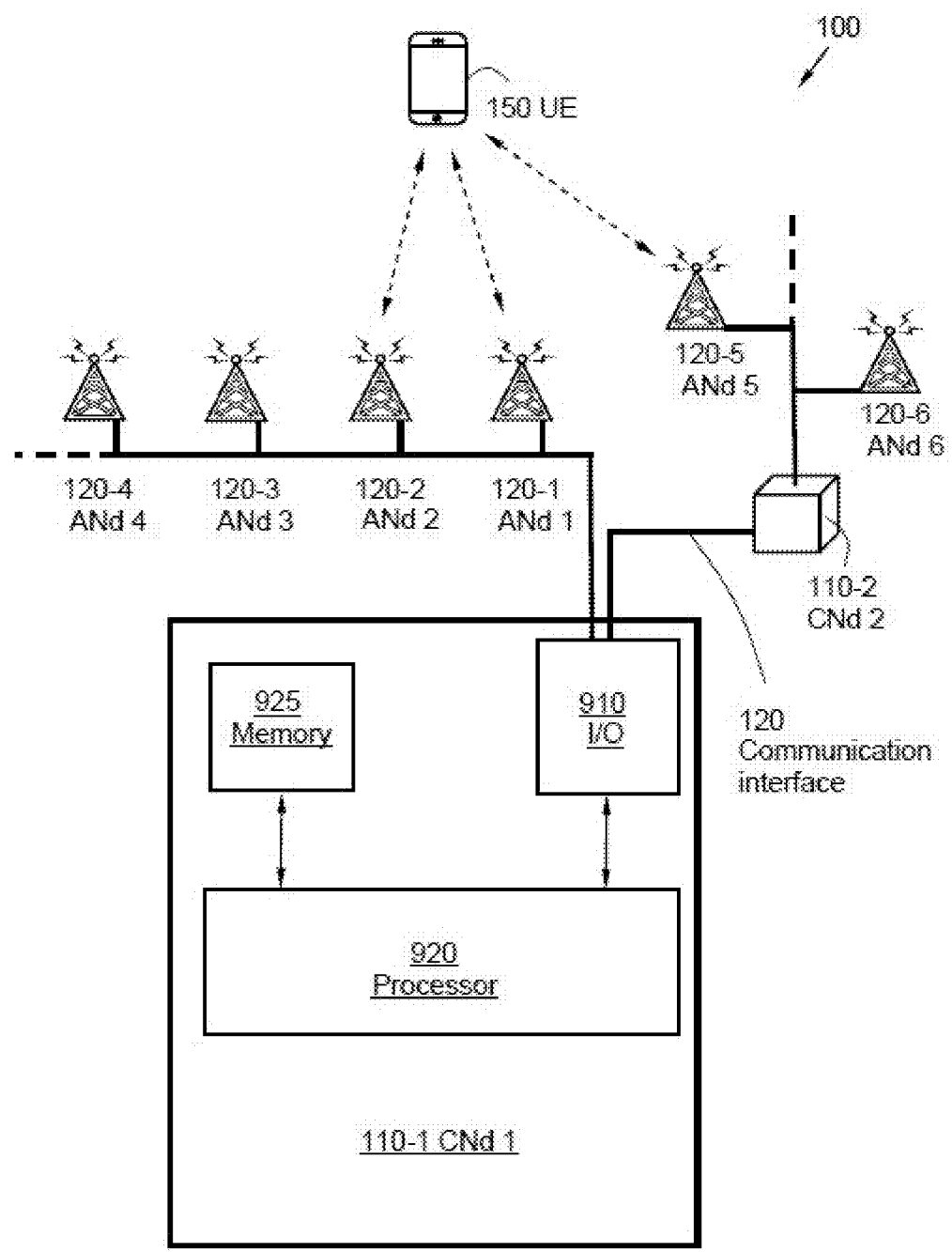
FIG. 9 is a block diagram illustrating a wireless communication network according to some embodiments of the disclosure.

FIG. 9 illustrates a wireless communication system 100 comprising a first CNd 110-1 for selecting serving CNd for a UNd 150, by communication with at least a second CNd 110-2 over a communication interface 120. The UNd 150 transmits an uplink beacon signal, to be received by at least one ANd 140-1, 140-2, . . . , 140-9 in a CNd control region 130-1, 130-2 of the first CNd 110-1. The ANd 140-1, 140-2, . . . , 140-9 detects the UNd 150 uplink beacon signal by decoding its sequence code.

Thus, the first CNd 110-1 and the second CNd 110-2 may cooperate in selecting serving CNd for the UNd 150 by exchanging information and communicate with each other over the communication interface 120.

The first CNd 110-1 is configured for performing the method 800 according to any, at least one, some or all of the enumerated method steps 801-804, according to some embodiments.

For enhanced clarity, any internal electronics or other components of the first CNd 110-1, the second CNd 110-2 and other nodes in the wireless communication system 100, not completely indispensable for understanding the herein described embodiments has been omitted from FIG. 9.

The first CNd 110-1 is configured to receive an uplink beacon measurement report concerning the UNd 150, i.e. comprising at least one measurement of the UNd 150 from the ANd 140-1, 140-2, . . . , 140-9 controlled by the first CNd 110-1. Furthermore, the first CNd 110-1 is in addition configured to preliminary select serving CNd for the UNd 150, based on the received uplink beacon measurement report concerning the UNd 150. The first CNd 110-1 is also configured to confirm the preliminary selection by communication with the second CNd 110-2. Further the first CNd 110-1 is also configured to select serving CNd for the UNd 150 when the preliminary selected serving CNd is confirmed by the second CNd 110-2.

Further, in some embodiments, the first CNd 110-1 may be additionally configured to select serving CNd for the UNd 150 based on a received uplink beacon signal power exceeding a threshold value allowing for decoding of the uplink beacon, as received by the ANd 140-1, 140-2, . . . , 140-9, comprised in the received beacon measurement report; or a ratio between the number of ANds 140-1, 140-2, . . . , 140-9 controlled by the first CNd 130-1 and the number of ANds 140-1, 140-2, . . . , 140-9 controlled by the second CNd 130-2, which have received the uplink beacon of the UNd 150 with an uplink beacon signal power exceeding the threshold value allowing for decoding of the beacon; exceeding a threshold ratio.

In some embodiments, the first CNd 110-1 is further configured to confirm the preliminary selection by sending a selection request to the second CNd 110-2 and receiving a selection acceptance from the second CNd 110-2, whereafter the CNd 110-1, 110-2 requested as serving CNd in the selection request is selected as serving CNd for the UNd 150.

Furthermore, according to some embodiments, the first CNd 110-1 is further configured to transfer a signature sequence used by the UNd 150 to the second CNd 110-2.

In some further embodiments, the first CNd 110-1 is further configured to receive information on the signature sequence of the uplink beacon signal of the UNd 150 from the second CNd 110-2. The first CNd 110-1 may also be further configured to determine if the received signature sequence could be used by the UNd 150 when the first CNd 110-1 is selected as serving CNd for the UNd 150 without conflicting with other signature sequences allocated by the first CNd 110-1.

Further, the first CNd 110-1 is also configured to confirm the preliminary selection by transmitting a measurement report to the second CNd 110-2, receiving a selection request from the second CNd 110-2 and sending a selection acceptance to the second CNd 110-2.

The first CNd 110-1 may comprise an Input/Output (I/O) unit 910, configured to receive an uplink beacon measurement report concerning the UNd 150, from the ANd 140-1, 140-2, . . . , 140-9. The I/O unit 910 may be further configured to send control information associated with the selection of serving CNd, to the UNd 150, in some embodiments.

Further, the first CNd 110-1 may comprise a processor 920, configured to preliminary select serving CNd for the UNd 150, based on the received uplink beacon measurement report concerning the UNd 150. The processor 920 may also be configured to confirm the preliminary selection by communication with the second CNd 110-2, and to select serving CNd for the UNd 150 when the preliminary selected serving CNd is confirmed by the second CNd 110-2.

Such processor 920 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein utilised expression "processor" may thus represent a processing circuitry comprising a plurality of processing circuits, such as, e.g., any, some or all of the ones enumerated above.

In further addition, the first CNd 110-1 may comprise at least one memory 925, according to some embodiments. The optional memory 925 may comprise a physical device utilised to store data or programs, i.e., sequences of instructions, on a temporary or permanent basis. According to some embodiments, the memory 925 may comprise integrated circuits comprising silicon-based transistors. Further, the memory 925 may be volatile or non-volatile.

At least a sub-set of the previously described method steps 801-804 to be performed in the first CNd 110-1 may be implemented through the one or more processors 920 in the first CNd 110-1, together with a computer program product for performing the functions of at least some of the steps 801-804. Thus a computer program product, comprising instructions for performing the steps 801-804 may select serving CNd for the UNd 150, in cooperation with the second CNd 110-2 over a communication interface 120, when the computer program is loaded into a processor 920 of the first CNd 110-1.

The computer program product mentioned above may be provided for instance in the form of a data carrier carrying computer program code for performing at least some of the actions 801-804 according to some embodiments when being loaded into the processor 920. The data carrier may be, e.g., a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the first CNd 110-1 remotely, e.g., over an Internet or an intranet connection.

Further, a second CNd 110-2 is illustrated in FIG. 9. The second CNd 110-2 is configured to communicate with a first CNd 110-1, over the communication interface 120. The second CNd 110-2 is further configured to receive an uplink beacon measurement report concerning a UNd 150 from at least one ANd 140-1, 140-2, . . . , 140-9, controlled by the second CNd 110-2. Additionally the second CNd 110-2 is further configured to communicate information related to serving CNd selection of the UNd 150, with the first CNd 110-1.

Thus, the second CNd 110-2 may cooperate by communication with the first CNd 110-1 in selecting serving CNd for the UNd 150.

The second CNd 110-2 may in some embodiments be configured to determine a number of ANds 140-1, 140-2, . . . , 140-9 controlled by the second CNd 130-2, which have received an uplink beacon of the UNd 150, with an uplink beacon signal power exceeding a threshold value allowing for decoding of the beacon. The communicated information comprises the determined number of ANds 140-1, 140-2, . . . , 140-9.

Further, the second CNd 110-2 in some embodiments may be configured to communicate with the first CNd 110-1 receiving a selection request from the first CNd 110-1 and sending a selection acceptance to the first CNd 110-1, whereafter the CNd 110-1, 110-2 requested as serving CNd in the selection request is selected as serving CNd for the UNd 150.

The second CNd 110-2 may, according to some embodiments be configured to receive information on the signature sequence of the uplink beacon signal of the UNd 150 from the first CNd 110-1 and check if the received signature sequence could be used by the Und 150 when the second CNd 110-2 is selected as serving CNd for the UNd 150 without conflicting with other signature sequences allocated by the second CNd 110-2.

In some embodiments, the second CNd 110-2 may be configured to send information on the signature sequence of the uplink beacon signal of the UNd 150, to the first CNd 110-1.

Further, the second CNd 110-2 may also be configured to communicate information related to serving CNd selection of the UNd 150 by receiving a measurement report concerning the UNd 150, from the first CNd 110-1. Also, the second CNd 110-2 may be configured to suggest a serving CNd to be selected for the UNd 150, such as e.g. the first CNd 110-1, based on the measurement report concerning the UNd 150 received from the first CNd 110-1 and the uplink beacon measurement report concerning the UNd 150 received from the ANd 140-1, 140-2, . . . , 140-9, controlled by the second CNd 110-2. The second CNd 110-2 may also be configured to send a selection request to the first CNd 110-1 and receive a selection acceptance from the first CNd 110-1.

FIG. 9 also discloses a UNd 150 for transmitting an uplink beacon to be received by an ANd 140-1, 140-2, . . . , 140-9 controlled by a serving CNd 110-1, 110-2. The UNd 150 is configured to receive a signature sequence from the CNd 110-1, 110-2 being a serving CNd. Further, the UNd 150 is configured to transmit the uplink beacon to be received by the ANd 140-1, 140-2, . . . , 140-9.

The communication interface 120 between the first CNd 110-1 according to any of the above described embodiments, for communication with the second CNd 110-2 according to any of the above described embodiments when selecting serving CNd for the UNd 150.

Figure 10:
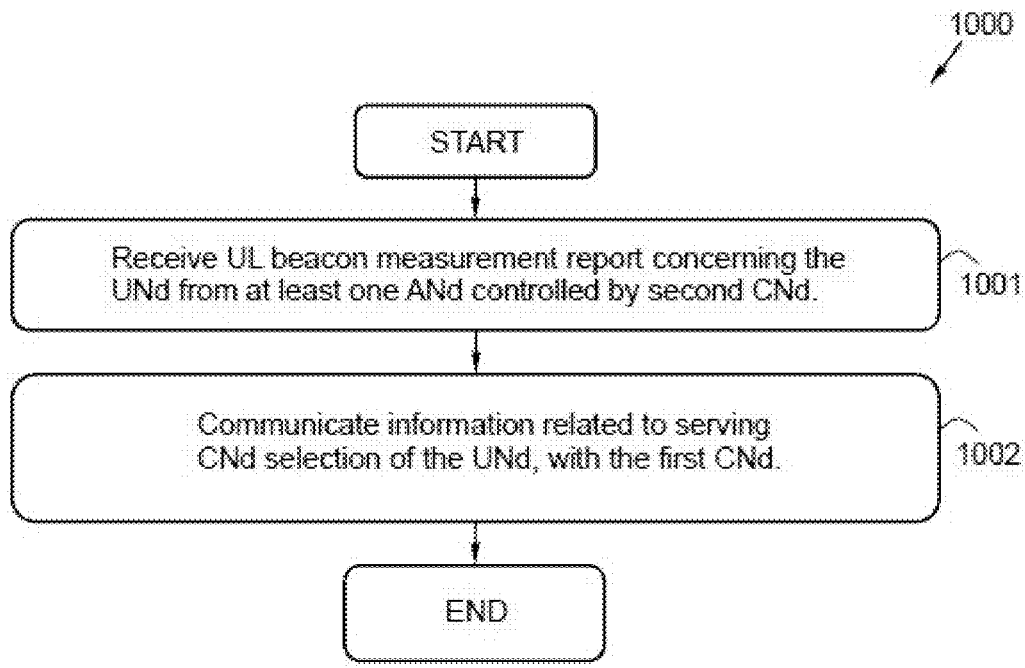
FIG. 10 is a flow chart illustrating a method according to an embodiment of the disclosure.

FIG. 10 is a flow chart illustrating embodiments of a method 1000 for use in a second Control Node (CNd) 110-2, for communicating with a first CNd 110-1. Thereby the second CNd 110-2 may select serving CNd for a User Node (UNd) 150 in cooperation with the first CNd 110-1 i.e. by communication with said first CNd 110-1. The UNd 150 transmits an uplink beacon signal, to be received by at least one Access Node (ANd) 140-1, 140-2, . . . , 140-9 in a CNd control region 130-1, 130-2 of the first CNd 110-1, and/or the second CNd 110-2. The ANd 140-1, 140-2, . . . , 140-9 detects the UNd 150 uplink beacon signal by decoding its sequence code.

To appropriately reselect serving CNd for the UNd 150, the method 1000 may comprise a number of method steps 1001-1002.

It is however to be noted that any, some or all of the described steps 1001-1002, may be performed in a somewhat different chronological order than the enumeration indicates, be performed simultaneously or even be performed in a reversed order according to different embodiments. Further, it is to be noted that some steps may be performed in a plurality of alternative manners according to different embodiments, and that some such alternative manners may be performed only within some, but not necessarily all embodiments.

The second CNd 110-2 may in some embodiments periodically re-perform any, some or all of steps 1001-1002, thereby enabling a selection of serving CNd for the UNd 150, due to mobility of the UNd 150 according to some embodiments. The method 1000 may comprise the following method steps:

Step 1001 comprises receiving an uplink beacon measurement report concerning the UNd, 150 from at least one ANd 140-1, 140-2, . . . , 140-9, controlled by the second CNd 110-2.

Step 1002 comprises communicating information related to serving CNd selection of the UNd 150, with the first CNd 110-1.

In some embodiments, the method 1000 may comprise determining a number of ANds 140-1, 140-2, . . . , 140-9 controlled by the second CNd 130-2, which have received an uplink beacon of the UNd 150, with an uplink beacon signal power exceeding a threshold value allowing for decoding of the beacon. In some such embodiments, the communicated information may comprise the determined number of ANds 140-1, 140-2, . . . , 140-9.

Further, according to some embodiments, the communication between the first CNd 110-1 and the second CNd 130-2 comprises receiving a selection request from the first CNd 110-1. Further the communication comprises sending a selection acceptance to the first CNd 110-1, whereafter the CNd 110-1, 110-2 requested as serving CNd in the selection request is selected as serving CNd for the UNd 150.

Also, the communication may comprise receiving information on the signature sequence of the uplink beacon signal of the UNd 150 from the first CNd 110-1, in case the second CNd 110-2 is selected as serving CNd for the UNd 150. Thereby the second CNd 110-2 can make sure that the signature sequence will not conflict with other signature sequences allocated by the second CNd 110-2.

Furthermore, the method 1000 may comprise checking if the received signature sequence could be used by the UNd 150 when the second CNd 110-2 is selected as serving CNd for the UNd 150 without conflicting with other signature sequences allocated by the second CNd 110-2.

The communication may comprise sending information on the signature sequence of the uplink beacon signal of the UNd 150, to the first CNd 110-1.

Furthermore, the communication may comprise receiving a measurement report concerning the UNd 150, from the first CNd 110-1. The communication may also comprise suggesting a serving CNd to be selected for the UNd 150, based on the measurement report concerning the UNd 150 received from the first CNd 110-1 and the uplink beacon measurement report concerning the UNd 150 received from the ANd 140-1, 140-2, . . . , 140-9, controlled by the second CNd 110-2. In addition the communication further may comprise sending a selection request to the first CNd 110-1; and receiving a selection acceptance from the first CNd 110-1.

Furthermore, in some embodiments, control information associated with the selection of serving CNd may be sent to the UNd 150.

At least a sub-set of the previously described method steps 1001-1002 to be performed in the second CNd 110-2 may be implemented through the one or more processors in the second CNd 110-2, together with a computer program product for performing the functions of at least some of the steps 1001-1002. Thus a computer program product, comprising instructions for performing the steps 1001-1002 may select serving CNd for the UNd 150, in cooperation with the first CNd 110-1 over a communication interface 120, when the computer program is loaded into a processor of the second CNd 110-2.

The computer program product mentioned above may be provided for instance in the form of a data carrier carrying computer program code for performing at least some of the actions 1001-1002 according to some embodiments when being loaded into the processor. The data carrier may be, e.g., a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the second CNd 110-2 remotely, e.g., over an Internet or an intranet connection.

The terminology used in the description of the embodiments as illustrated in the accompanying drawings is not intended to be limiting of the described methods 800, 1000, first CNd 110-1, second CNd 110-2 and/or communication interface 120. Various changes, substitutions and/or alterations may be made, without departing from the invention as defined by the appended claims.

As used herein, the term "and/or" comprises any and all combinations of one or more of the associated listed items. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

What is claimed is:

1. A first Control Node (CNd) for selecting a serving CNd for a User Node (UNd) by communication with at least a second CNd, the first CNd comprising:
    a memory storing instructions; and
    a processor configured to execute the instructions to cause the first CNd to:
        receive, from at least one Access Node (And) controlled by the first CNd, an uplink beacon measurement report comprising at least one measurement of a UNd uplink beacon;
        preliminarily select a serving CNd for the UNd, based on the received uplink beacon measurement report;
        confirm the preliminarily selected serving CNd by communication with the second CNd; and
        select the serving CNd for the UNd when the preliminarily selected serving CNd is confirmed by the second CNd.

2. The first CNd according to claim 1, wherein selecting the serving CNd for the UNd when the preliminary selected serving CNd is confirmed by the second CNd is based on:
    a received uplink beacon signal power exceeding a threshold value allowing for decoding of the UNd uplink beacon, as received by the ANd, comprised in the received beacon measurement report; or
    a ratio between a number of ANds controlled by the first CNd and a number of ANds controlled by the second CNd that have received the UNd uplink beacon with an uplink beacon signal power exceeding a threshold value allowing for decoding of the beacon, wherein the ratio exceeds a threshold ratio.

3. The first CNd according to claim 1, wherein confirming the preliminarily selected serving CNd by communication with the second CNd comprises:
    sending a selection request to the second CNd; and
    receiving a selection acceptance from the second CNd;
    whereafter a CNd requested as a serving CNd in the selection request is selected as the serving CNd for the UNd.

4. The first CNd according to claim 3, wherein confirming the preliminarily selected serving CNd by communication with the second CNd further comprises:
    transferring a signature sequence used by the UNd to the second CNd.

5. The first CNd according to claim 1, wherein executing the instructions further causes the first CNd to:
    receive information on a signature sequence of an uplink beacon signal of the UNd from the second CNd; and
    determine if the received signature sequence could be used by the UNd when the first CNd is selected as the serving CNd for the UNd without conflicting with other signature sequences allocated by the first CNd.

6. The first CNd according to claim 5, wherein confirming the preliminarily selected serving CNd by communication with the second CNd comprises:
    transmitting a measurement report to the second CNd;
    receiving a selection request from the second CNd; and
    sending a selection acceptance to the second CNd.

7. A method for selecting a serving Control Node (CNd) for a User Node (UNd) by communication with at least a second CNd, the method comprising:
    receiving, by a first CNd from at least one Access Node (ANd) controlled by the first CNd, an uplink beacon measurement report comprising at least one measurement of a UNd uplink beacon;
    preliminarily selecting a serving CNd for the UNd, based on the received uplink beacon measurement report;
    confirming the preliminarily selected serving CNd by communication with the second CNd; and
    selecting the serving CNd for the UNd when the preliminarily selected serving CNd is confirmed by the second CNd.

8. A second Control Node (CNd) for communicating with a first CNd, the second CNd comprising:
    a memory storing instructions; and
    a processor configured to execute the instructions to cause the second CNd to:
        receive an uplink beacon measurement report concerning a User Node (UNd) from at least one Access Node (ANd) controlled by the second CNd; and
        communicate, with the first CNd, information related to a serving CNd selection of the UNd.

9. The second CNd according to claim 8, wherein executing the instructions further causes the second CNd to:
    determine a number of ANds controlled by the second CNd that have received an uplink beacon of the UNd and have an uplink beacon signal power exceeding a threshold value allowing for decoding of the uplink beacon;
    wherein the information communicated with the first CNd comprises the determined number of ANds.

10. The second CNd according to claim 8, wherein communicating with the first CNd comprises:
    receiving a selection request from the first CNd; and
    sending a selection acceptance to the first CNd;

whereafter the CNd requested as the serving CNd in the selection request is selected as the serving CNd for the UNd.

11. The second CNd according to claim 10, wherein executing the instructions further causes the second CNd to:
receive information on a signature sequence of an uplink beacon signal of the UNd from the first CNd; and
determine whether the received signature sequence could be used by the UNd when the second CNd is selected as the serving CNd for the UNd without conflicting with other signature sequences allocated by the second CNd.

12. The second CNd according to claim 11, wherein executing the instructions further causes the second CNd to:
send information on the signature sequence of the uplink beacon signal of the UNd to the first CNd.

13. The second CNd according to claim 8, wherein communicating with the first CNd comprises:
receiving a measurement report concerning the UNd from the first CNd;
suggesting a serving CNd to be selected for the UNd based on the measurement report concerning the UNd received from the first CNd and the uplink beacon measurement report concerning the UNd received from the ANd, controlled by the second CNd;
sending a selection request to the first CNd; and
receiving a selection acceptance from the first CNd.

14. A method for communicating with a first Control Node (CNd), the method comprising:
receiving, by a second CNd, an uplink beacon measurement report concerning a User Node (UNd) from at least one Access Node (ANd) controlled by the second CNd; and
communicating, with the first CNd, information related to a serving CNd selection of the UNd.

15. A User Node (UNd) for transmitting an uplink beacon to be received by an Access Node (ANd) controlled by a Control Node (CNd), the UNd comprising:

a memory storing instructions; and
a processor configured to execute the instructions to cause the UNd to:
receive a signature sequence from the CNd being a serving CNd; and
transmit an uplink beacon to be received by the ANd based on the signature sequence.

16. A system for selecting a serving Control Node (CNd) for a User Node (UNd), the system comprising:
a first CNd; and
a second CNd
wherein the first CNd is configured to:
receive, from at least one Access Node (ANd) controlled by the first CNd, an uplink beacon measurement report comprising at least one measurement of a UNd uplink beacon;
preliminarily select a serving CNd for the UNd based on the received uplink beacon measurement report concerning the UNd;
confirm the preliminarily selected serving CNd by communication with the second CNd; and
select the serving CNd for the UNd when the preliminarily selected serving CNd is confirmed by the second CNd;
wherein the second CNd is configured to:
receive, from the ANd, the uplink beacon measurement report concerning the UNd controlled by the second CNd;
communicate information related to serving CNd selection of the UNd with the first CNd, when selecting the serving CNd for the UNd;
wherein the first CNd is further configured to:
receive a signature sequence from the CNd being the serving CNd; and
transmit an uplink beacon to be received by the ANd.

* * * * *